United States Patent [19]
Itoh et al.

[11] Patent Number: 5,688,053
[45] Date of Patent: Nov. 18, 1997

[54] DYNAMIC PRESSURE BEARING

[75] Inventors: Masao Itoh; Satoshi Shibuya; Naoji Kamimura, all of Hachioji, Japan

[73] Assignee: Konica Corporation, Japan

[21] Appl. No.: 697,376

[22] Filed: Aug. 23, 1996

[30] Foreign Application Priority Data

Aug. 31, 1995 [JP] Japan .................. 7-223171

[51] Int. Cl.$^6$ ........................................... F16C 32/06
[52] U.S. Cl. ................................... 384/100; 384/112
[58] Field of Search ........................ 384/100, 107, 384/112, 114, 121, 126, 625

[56] References Cited

U.S. PATENT DOCUMENTS

| | | | |
|---|---|---|---|
| 5,019,738 | 5/1991 | Weilbach et al. | 384/100 X |
| 5,224,782 | 7/1993 | Miwa et al. | 384/100 |
| 5,357,162 | 10/1994 | Aiyoshizawa et al. | 384/112 X |
| 5,538,347 | 7/1996 | Itoh et al. | 384/123 X |

*Primary Examiner*—Thomas R. Hannon
*Attorney, Agent, or Firm*—Jordan B. Bierman; Bierman, Muserlian and Lucas LLP

[57] ABSTRACT

An apparatus for supporting a rotator, comprises a radial bearing and a thrust bearing, wherein at least one of a radial bearing surface, a supported surface of the rotor facing the radial bearing surface, a thrust bearing surface and a regulated surface of the rotor facing the thrust bearing surface is a rough surface having a center-line mean roughness not less than 0.3 and a surface facing the rough surface is a smooth surface having a center-line mean roughens less than 0.3.

16 Claims, 4 Drawing Sheets

DYNAMIC PRESSURE BEARING

BACKGROUND OF THE INVENTION

The present invention relates to a dynamic pressure bearing in a rotation machine which enables a rotor high speed rotation due to forming a recess for generating dynamic pressure on both of or either of a static material constituting a bearing and/or a rotor which faces the above-mentioned static material and due to forming an air gap between a rotor and the static material caused by the effect of the above-mentioned recess for generating dynamic pressure by rotation of the rotor, and specifically relates to a dynamic pressure bearing causing starting and smooth rotation of the rotor.

Conventionally, for high speed rotating of a polygonal mirror which is an optical deflecting device used in an image forming apparatus, a polygonal mirror was mounted on a shaft through a ball bearing provided on a high speed motor, and thereby aforesaid polygonal mirror was rotated at high speed. With regard to supporting by the ball bearing, starting is assured though, there is limit in terms of number (rate) of rotation. Therefore, in order to realize further higher rotation speed, the dynamic pressure bearing has come to be used. When mounting a rotor using a dynamic pressure bearing, in order to realize high speed rotating by forming an air gap, it is conventionally principle to mount it horizontally. The dynamic pressure bearing introduces air generated by the high speed rotation of the rotor into the above-mentioned recess for generating dynamic pressure mounted on the static material as described above. Due to the above-mentioned air, strong air from the above-mentioned recess for generating dynamic pressure is applied onto the above-mentioned rotor, an air gap of several µm was formed between the static material face and the face of the rotor. In addition, by reducing resistance between the static material and the rotor, high speed rotation of the rotor can be achieved. As a mechanism using the above-mentioned dynamic bearing in an image forming apparatus, a polygonal mirror is known (see Japanese Utility Publication Open to Public inspection Nos. 38330/1992 and 16574/1993).

In an image forming apparatus, specifically in a laser beam printer, it is necessary to increase rotation number additionally in order to obtain higher speeds and higher image quality. Therefore, a dynamic pressure bearing capable of rotating the rotor by means of an air gap has come to be used. When actuating rotation of a polygonal mirror supported by the dynamic pressure bearing as described above, concurrently with activation of the image forming apparatus and the power supplied into the image forming apparatus, power supply is energized to the plural of the above-mentioned stator coils. However, when the dynamic pressure bearing stops, an air gap is not formed due to the weight of the rotor and the polygonal mirror. Specifically, the thrust bearing placed lower side and the lower surface of the rotor is in contact status. Therefore, when rotation is initially actuated due to driving force of plural of the above-mentioned stator coil and the magnets of the rotor, the weight of the above-mentioned rotor and the polygonal mirror generate resistance on the bearing face so that the rotation is difficult to be actuated. In addition, after generation of dew condensation between the rotation sections of the above-mentioned dynamic pressure bearing, dew condensation may be dried due to chilling of external air so that between rotation section may be stacked. In addition, when the coarseness of the above-mentioned rotor and that of the thrust bearing face are concurrently low, namely approximately a mirror surface, a ringing effect (contact phenomenon) is caused so that starting become further difficult. In extreme cases, even when the switch of the image forming apparatus is activated, the polygonal mirror does not start so that the image forming operation cannot be started.

SUMMARY OF THE INVENTION

The present invention was specifically attempted for fully overcoming the above-mentioned problems. Namely, an object of the invention is to constitute a bearing for a polygonal mirror used as an optical deflecting apparatus with a dynamic pressure bearing, and concurrently with this, when actuating rotation of aforesaid dynamic pressure bearing, it can smoothly be started.

For attaining the above-mentioned objects, the present invention is constituted as follows. A dynamic pressure bearing having a radial bearing, a thrust bearing provided at both ends of aforesaid radial bearing and a rotor provided rotatably on the above-mentioned radial bearing and the above-mentioned thrust bearing, wherein one of the surfaces of the contact portion between the above-mentioned rotor and the above-mentioned radial bearing is a smooth surface of less than Ra 0.3 and the other surface coarseness is a coarse surface or a rough surface of Ra 0.3 or more and the surface coarseness between the above-mentioned rotor and the above-mentioned thrust bearing is a smooth surface of less than Ra 0.3 and the other of the surface coarseness is a coarse surface of Ra 0.3 or more.

Composed of a dynamic pressure bearing incorporating a radial bearing, a thrust bearing provided at both end of aforesaid radial bearing and a rotor provided rotatably on the above-mentioned radial bearing and the above-mentioned thrust bearing, wherein one of the surfaces of the contact portion between the above-mentioned rotor and the above-mentioned radial bearing is a smooth surface of less than Ra 0.3 and the other surface coarseness is a coarse surface of Ra 0.3 or more and the surface coarseness between the above-mentioned rotor and the above-mentioned thrust bearing is a smooth surface of less than Ra 0.3 and the other of the surface coarseness is a coarse surface of Ra 0.3 or more, a polygonal mirror and a magnet integrally provided on the above-mentioned rotor and a stator coil provided facing to aforesaid magnet, and by energizing aforesaid stator coil, the above-mentioned polygonal mirror integrally provided on the above-mentioned rotor is rotated.

An optical deflecting apparatus, composed of a dynamic pressure bearing having a radial bearing, a thrust bearing provided at both end of aforesaid radial bearing and a rotor provided rotatably on the above-mentioned radial bearing and the above-mentioned thrust bearing, wherein one of the surfaces of the contact portion between the above-mentioned rotor and the above-mentioned radial bearing is a smooth surface of less than Ra 0.3 and the other surface coarseness is a coarse surface of Ra 0.3 or more and the surface coarseness between the above-mentioned rotor and the above-mentioned thrust bearing is a smooth surface of less than Ra 0.3 and the other of the surface coarseness is a coarse surface of Ra 0.3 or more, a polygonal mirror and a magnet integrally provided on the above-mentioned rotor and a stator coil provided facing to aforesaid magnet, which rotates the above-mentioned polygonal mirror integrally provided on the above-mentioned rotor by energizing aforesaid stator coil, and laser beam scanned by aforesaid optical deflection device is irradiated onto a photoreceptor.

The above-mentioned optical deflection device is composed of an optical deflection device driving circuit, a semi-conductor laser luminescence material, a laser luminescence control circuit, an optical system for laser alignment, a fθ lens, a cylindrical lens, a synchronisity sensor and a laser beam reflecting mirror.

A dynamic pressure bearing having a radial bearing, a thrust bearing provided at either end of aforesaid radial bearing and a rotor provided rotatably on the above-mentioned radial bearing and the above-mentioned thrust bearing, wherein one of the surfaces of the contact portion between the above-mentioned rotor and the above-mentioned radial bearing is a smooth surface of less than Ra 0.3 and the other surface coarseness is a coarse surface of Ra 0.3 or more and the surface coarseness between the above-mentioned rotor and the above-mentioned thrust bearing is a smooth surface of less than Ra 0.3 and the other of the surface coarseness is a coarse surface of Ra 0.3 or more.

Composed of a dynamic pressure bearing having a radial bearing, a thrust bearing provided at either end of aforesaid radial bearing and a rotor provided rotatably on the above-mentioned radial bearing and the above-mentioned thrust bearing, wherein one of the surfaces of the contact portion between the above-mentioned rotor and the above-mentioned radial bearing is a smooth surface of less than Ra 0.3 and the other surface coarseness is a coarse surface of Ra 0.3 or more and the surface coarseness between the above-mentioned rotor and the above-mentioned thrust bearing is a smooth surface of less than Ra 0.3 and the other of the surface coarseness is a coarse surface of Ra 0.3 or more, a polygonal mirror and a magnet integrally provided on the above-mentioned rotor and a stator coil provided facing to aforesaid magnet, and by driving aforesaid stator coil, the above-mentioned polygonal mirror integrally provided on the above-mentioned rotor is rotated.

An optical deflecting apparatus, composed of a dynamic pressure bearing incorporating a radial bearing, a thrust bearing provided at either end of aforesaid radial bearing and a rotor provided rotatably on the above-mentioned radial bearing and the above-mentioned thrust bearing, wherein one of the surface coarseness of the contact portion between the above-mentioned rotor and the above-mentioned radial bearing is either a smooth surface of less than Ra 0.3 and the other of the surface coarseness is a coarse surface of Ra 0.3 or more and the surface coarseness between the above-mentioned rotor and the above-mentioned thrust bearing is a smooth surface of less than Ra 0.3 and the other of the surface coarseness is a coarse surface of Ra 0.3 or more, a polygonal mirror and a magnet integrally provided on the above-mentioned rotor and a stator coil provided facing to aforesaid magnet, which rotates the above-mentioned polygonal mirror integrally provided on the above-mentioned rotor by energizing aforesaid stator coil, and laser beam scanned by aforesaid optical deflection device is irradiated on a photoreceptor.

The above-mentioned optical deflection device is composed of an optical deflection device driving circuit, a semi-conductor laser luminescence material, a laser luminescence control circuit, an optical system for laser alignment, a fθ lens, a cylindrical lens, a synchronisity sensor and a laser beam reflecting mirror.

Incidentally, the above-mentioned surface coarseness or the surface roughness is a center-line mean roughness Ra defined by JIS B 061-1982 and can be measured by the use of, for example, a Surfcoder SE-30H (produced by Osaka Laboratory Co., Ltd.).

DETAILED DESCRIPTION OF THE PREFERRED EMBODIMENT

Figure 1:
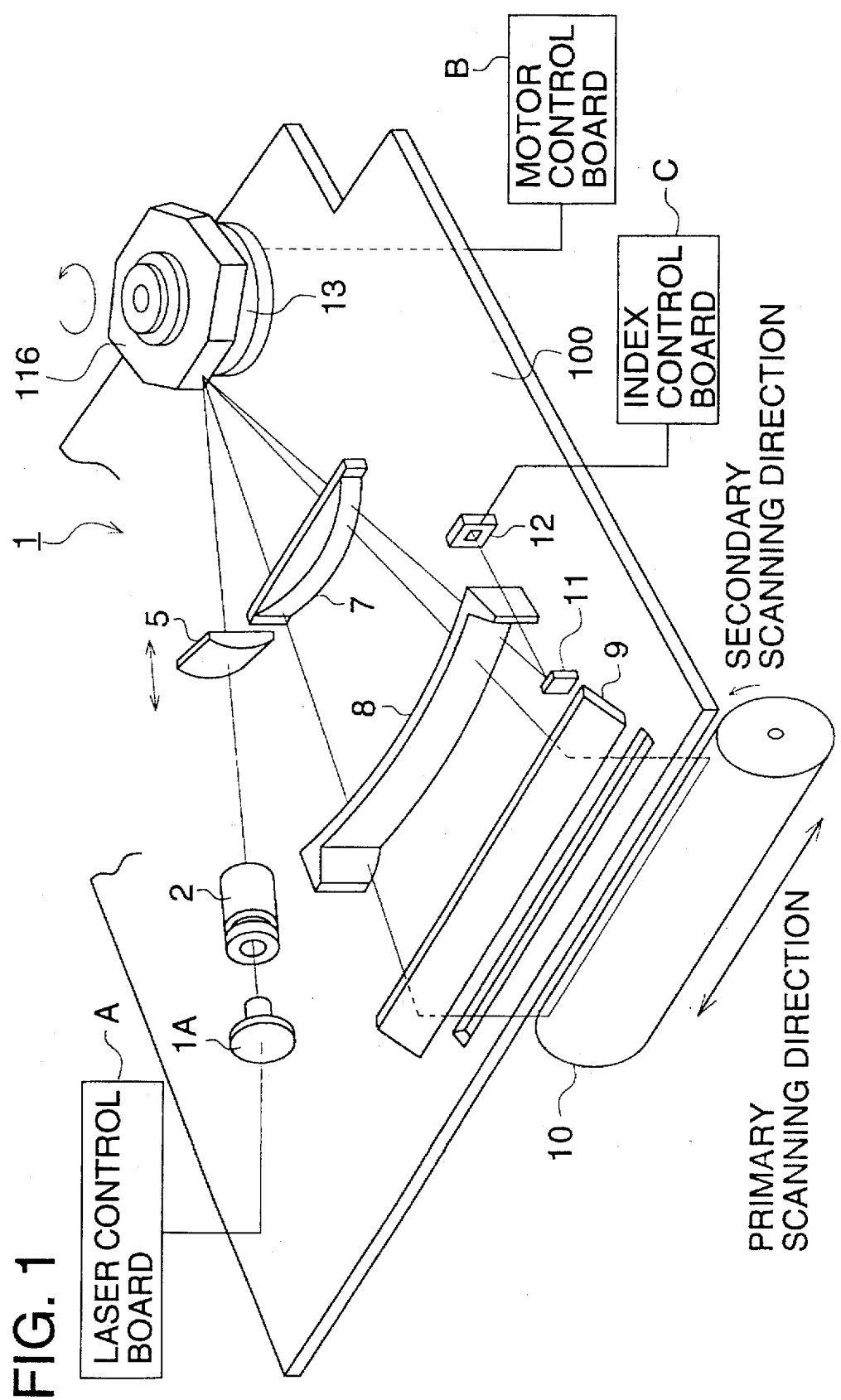
FIG. 1 is a perspective view of an optical beam scanning optical system wherein an optical deflecting device using a dynamic pressure bearing is used is provided.

FIG. 1 is a perspective view showing an example of a laser beam scanning optical system unit employing a dynamic pressure bearing of the present invention and also employing a polygonal mirror.

In this figure, numeral 100 represents a mounting plate. 1A represents a semi-conductor laser beam luminescence material, to which laser control panel A with an integral laser beam emitting control circuit is connected. Numeral 2 represents a collimeter lens (an optical system for beam alignment), 5 represents a first cylindrical lens, 116 represents a polygonal mirror, 7 represents an fθ lens, 8 represents a second cylindrical lens, 9 represents a reflection mirror and 10 represents a photoreceptor drum. Incidentally, numeral 11 represents a mirror to monitor timing and 12 represents a synchronisity sensor to which index control panel C is connected. Numeral 13 represents a driving motor for the above-mentioned polygonal mirror to which driving motor control panel B, which is an optical deflecting device driving circuit for rotating correctly driving motor 116. Beam outgoes from semi-conductor laser luminescence material 1A become parallel light by means of collimeter lens 2. The above-mentioned beams enter polygonal mirror 116 through first cylindrical lens 5 in the first image-forming optical system. This reflected light transmits the second image-forming optical system composed of fθ lens 7 and second cylindrical lens 8, and scans photoreceptor drum 10 with a prescribed spot diameter in a secondary scanning direction through reflection mirror 9. Incidentally, the primary scanning direction has by this time already been finely adjusted by an adjustment mechanism, not illustrated.

For synchronisity sensing for each line, beams prior to the start of scanning, are entered into synchronisity sensor 12 through mirror 11.

Figure 2:
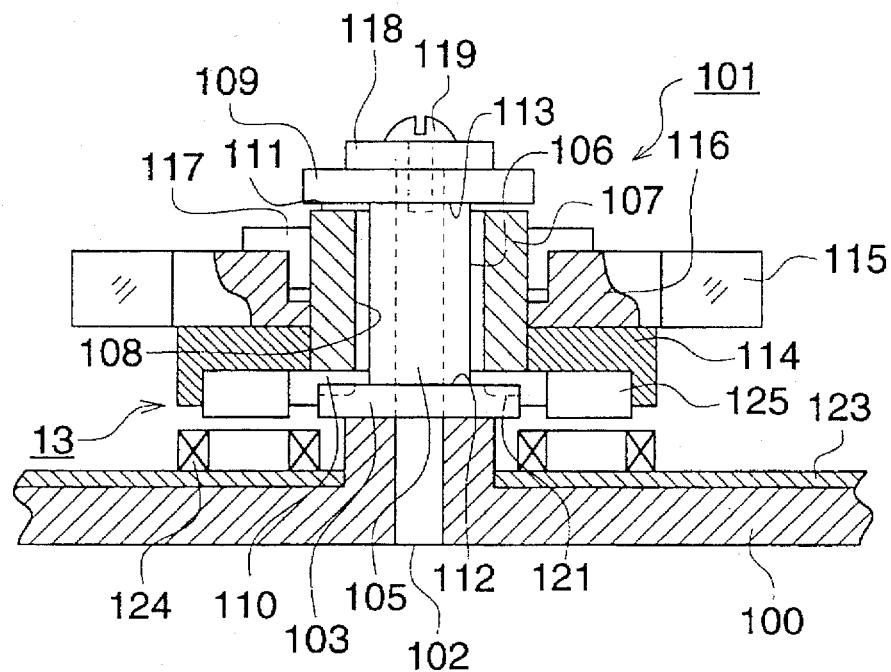
FIG. 2 is a cross-sectional view showing an optical deflecting device using a dynamic pressure bearing is used.

FIG. 2 shows the first example of a dynamic pressure bearing. Numeral 101 shows an overall cross-sectional view of the dynamic pressure bearing, used an apparatus with a polygonal mirror rotating at high speed. On the above-mentioned plate 100, one end of core shaft 102, for supporting and fixing the above-mentioned dynamic pressure bearing 101, is vertically fixed. An assembly method for the above-mentioned dynamic pressure bearing 101 is as follows. Firstly, on the above-mentioned core shaft 102, plate-shaped lower thrust bearing 103 is fixed to be provided. Next, radial bearing 105 penetrates the above-mentioned core shaft 102 and is fixed thereon. Incidentally, the above-mentioned lower thrust bearing 103 may be provided integrally with radial bearing 105, and may be fixed concurrently. Next, the above-mentioned rotor 107 is provided rotatably between guide face 106 formed on the outer circumference of the above-mentioned radial bearing 105 and counter face 108 formed on the inner circumference of rotor 107 in such a manner as to have a small (1–7 μm) clearance. Next, upper thrust bearing 109 penetrates in the above-mentioned core shaft 102 to be fixed. In this occasion, between counter faces 110 and 111 formed at the upper portion and the lower portion of the above-mentioned rotor 107 and guide face 112 for the above-mentioned lower thrust bearing 103 and guide face 113 for the upper thrust bearing 109, there are clearances in the same manner as before. Next, on the outer circumference of the above-mentioned rotor 107, supporting section 114 formed separately is integrally fixed. In addition, polygonal mirror 116 on which multiple reflection faces 115 are formed is fixed on supporting section 114 with fixing member 117 (the above-mentioned rotor may be integral with supporting section 114). After the above-mentioned assembly is completed, holding plate 118 is fixed on the other end of the above-mentioned core shaft 102 by means of screw 119. Thus, assembly is completed.

In addition, only on guide face 112 of the above-mentioned lower thrust bearing 103, recess 121 for generating dynamic pressure is formed.

On the above-mentioned plate 100, stator coils 124 are provided on insulation member 123 as a component of driving motor 13 shown in FIG. 1. Below supporting member 114 of the above-mentioned rotor 107, magnets 125, which face the above-mentioned stator coils 124, are provided across the rotation direction. The above-mentioned stator coils are energized. Thus, a driving motor 13 for the above-mentioned polygonal mirror wherein rotor is induced and rotated at high speed is structured. Due to rotation of aforesaid driving motor 13, dynamic pressure by means of the above-mentioned recess 121 for generating dynamic pressure is effected, forming an air gap with counter face 110 of the above-mentioned rotor so that smooth rotation at high speed is achieved. Dynamic pressure bearing 101 is structured as above, and is thus driven to be rotated.

In the present example, while rotor 107 is stopped, counter face 110 of rotor 107 is brought into contact with guide face 112 of the lower thrust bearing 103. Simultaneously with the initial rotation of rotor 107 with radial bearing 105 as the center, an air gap is formed between the above-mentioned guide face 112 and counter face 110 by means of recess 121 for generating dynamic pressure formed on the above-mentioned guide face 112 so that high speed rotation is possible. When the rotor 107 stops, counter face 110 of aforesaid rotor 107 is brought into physically contact with guide face 112 of lower thrust bearing 103 due to specific weight of rotor 107. Together with start of rotation, an air gap is formed in the same manner as in above.

Figure 3:
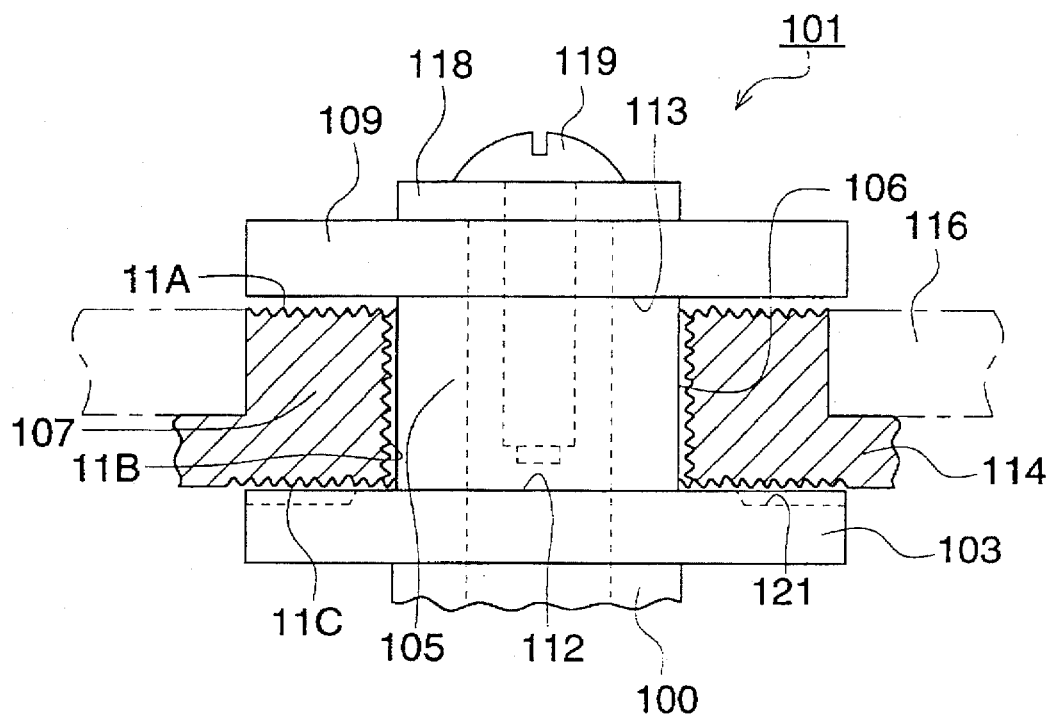
FIG. 3 is a magnified cross-sectional view of a dynamic pressure bearing of the present invention.
Figure 4:
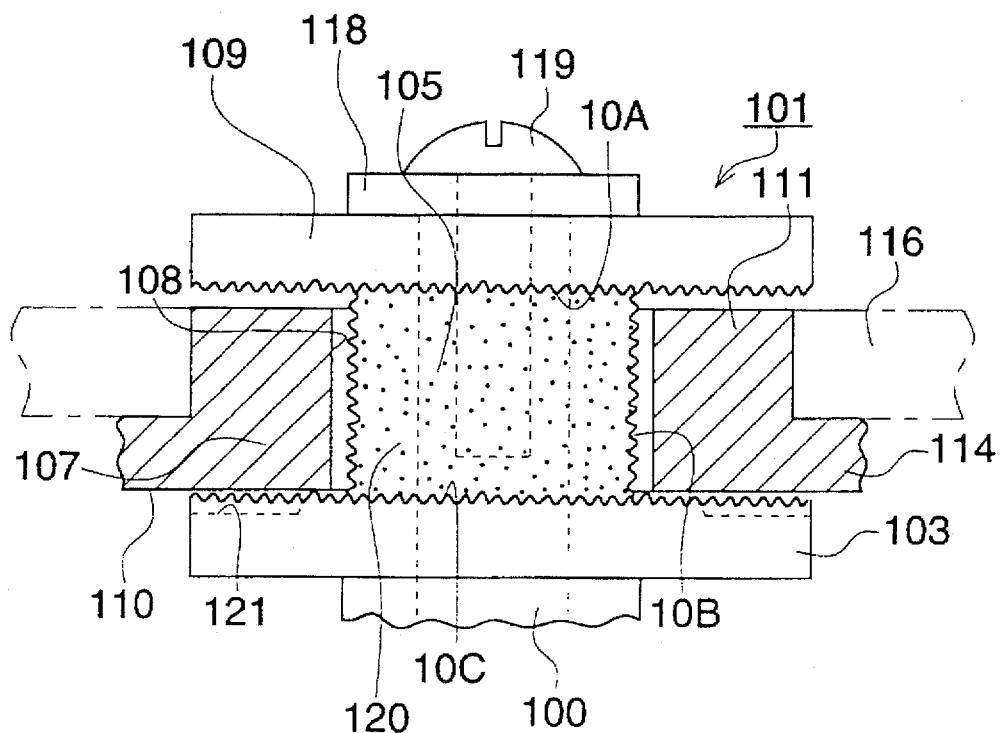
FIG. 4 is another magnified cross-sectional view of dynamic pressure bearing of the present invention.

FIGS. 3 and 4 show magnified drawings of parts of dynamic pressure bearing 101. The surface coarseness of each contact portion is exaggerated for better illustration.

FIG. 3 shows an example in which guide face 112 of the above-mentioned lower thrust bearing 103, guide face 113 of upper thrust bearing 109 and guide face 106 formed on radial bearing 105 are smooth surfaces, and counter faces 11A, 11B and 11C respectively formed on rotor 107 provided in such a manner as to provide an air gap between the above-mentioned guide faces 112, 113 and 106 are coarse surfaces.

FIG. 4 shows an example in which guide face 10C of the above-mentioned lower thrust bearing 103, guide face 10A of upper thrust bearing 109 and guide face 10B formed on radial bearing 105 are coarse surfaces, and counter faces 108, 110 and 111 respectively formed on rotor 107 provided in such a manner as to provide an air gap between the above-mentioned guide faces 10A, 10B and 10C are smoother surfaces.

As described above, and as shown in FIGS. 3 and 4, the present invention causes favorable starting properties of dynamic pressure bearing 101 by differentiating the surface coarseness of facing surface each other incidentally, it is not necessary that all of guide face 10C of lower thrust bearing 103, guide face 10A of upper thrust bearing 109 and guide face 10B of radial bearing 105 in the example shown in FIG. 4 and counter faces 11A, 11B, 11C and 11D in the example shown in FIG. 3 are coarse surfaces. At least the lower portion, preferably only the guide face of lower thrust bearing 103 may be coarse, or only guide face 10C of lower thrust bearing 103 and guide face 10B of radial bearing 105 may concurrently be coarse.

Figure 5:
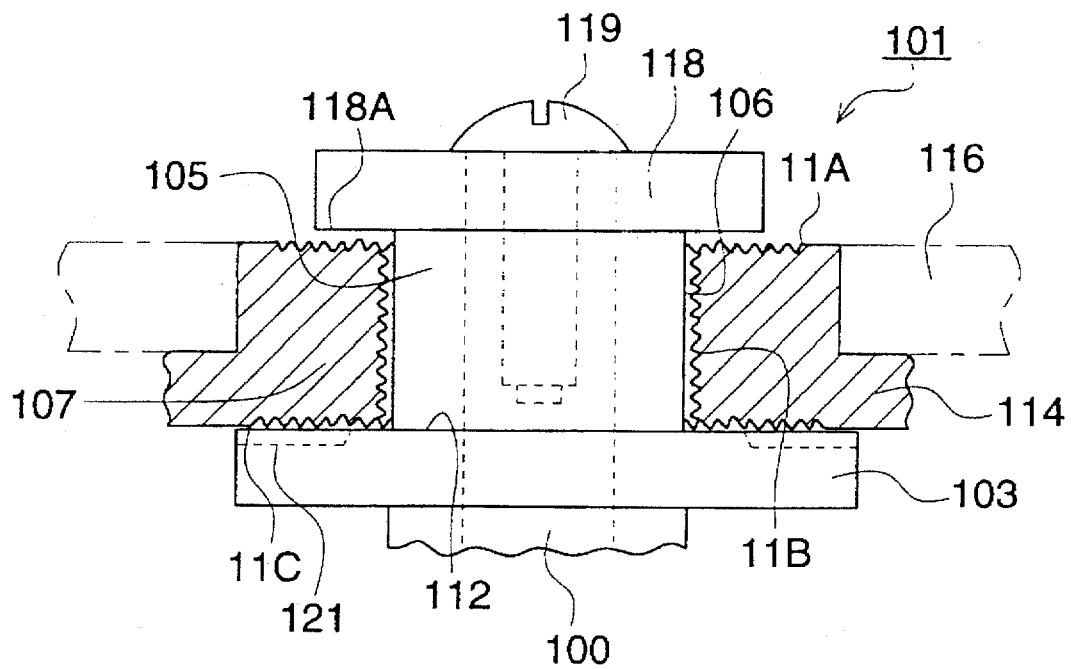
FIG. 5 is a cross-sectional view of an optical deflecting device using another dynamic pressure bearing of the present invention.

FIG. 5 shows the second example of the present invention, magnifying a part of dynamic pressure bearing 101 (with regard to mechanisms identical to the first example, the same numerals are used, and explanations are omitted). As shown in this figure, the present example is provided only with guide face 112 formed on the above-mentioned lower thrust bearing 103 and guide face 106 formed on radial bearing 105. Above them, member 118 to retain rotor 107 is provided, and in the same manner as in FIG. 1, member 118 to retain rotor 107 is fixed to the other end of the above-mentioned core shaft 102 by means of screw 119. Due to a structure in which the above-mentioned guide face 112, guide face 106 and contact face 118A of the above-mentioned member which retains rotor 107 with rotor 107 are caused to be smoother faces and counter faces 11A, 11B and 11C against rotor 107 are caused to be coarser faces, the same effects as in the above-mentioned first Example can be obtained.

The materials of the above-mentioned lower thrust bearing 103, the above-mentioned upper thrust bearing 109, radial bearing 105, member for retaining rotor 107 and rotor 107 constituting dynamic pressure bearing 101 in the first and second Examples explained as above may either be metal, or preferably ceramic. In addition, resins may be used.

The above-mentioned ceramic is excellent in terms of abrasion durability, galling which occurs when rotating and heat durability. However, since the above-mentioned ceramics are porous, dew condenses when temperature is low. When aforesaid dew condensation is dried, spotting occurs on the condensed surface. The spotting may hinder rotation. However, this problem can be overcome by differentiating the surface coarseness Ra of the above-mentioned rotor 107 and that of guide face 112 formed on the lower thrust bearing 103.

Figure 6:
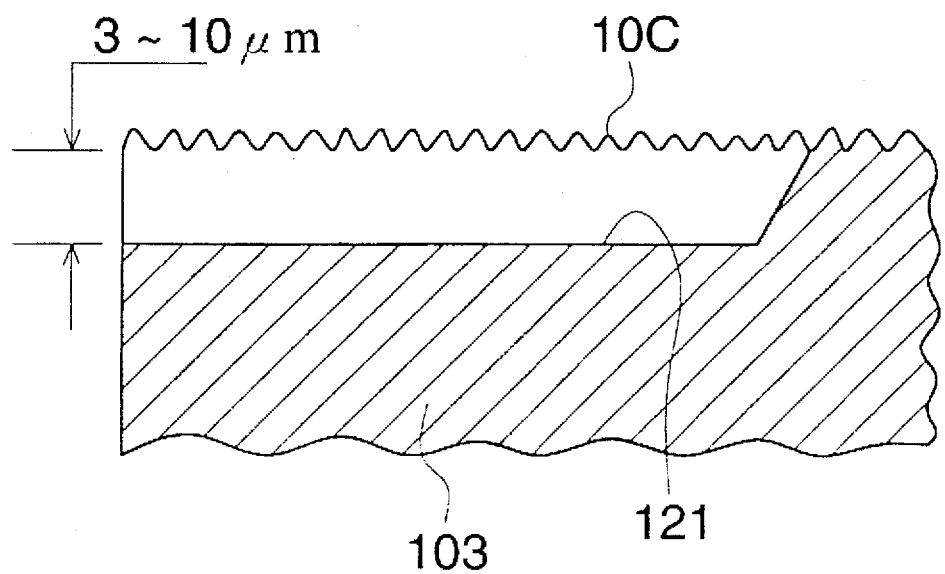
FIG. 6 is a magnified cross-sectional view of a thrust bearing of dynamic pressure bearing of the present invention.

FIG. 6 shows the relationship between recess 121 for generating dynamic pressure coarsened guide face 10C for the lower thrust bearing 103. In the above-mentioned FIG. 4, by maintaining the interval between the bottom of recess 121 for generating dynamic pressure formed on coarsened guide face 10C for the above-mentioned lower thrust bearing 103 and the bottom of the coarse surface formed on the above-mentioned coarsened guide face 10C, 3–10 μm, favorable dynamic pressure effect is obtained.

Incidentally, in the above-mentioned first and second examples, the recess for generating dynamic pressure was provided only on lower thrust bearing 103. However, it may also be provided on radial bearing 105 and lower thrust bearing 103, or it may be provided on radial bearing 105, lower thrust bearing 103 and upper thrust bearing 109 (in this occasion, only in the first example).

By specifying the surface coarseness of the guide face for dynamic pressure bearing 101 and that for the counter face for dynamic pressure bearing 101 as described above, ringing effect can be reduced so that smooth initial starting can be realized.

In the abovementioned examples, the cylinder 106 is made as a fixed shaft, the guide surfaces are provided on the outer circumference of the cylinder, and the rotor is provided on the cylinder 107 which surrounds the cylinder 106 and is used as a rotating cylinder. In addition, the present invention may be applied to the following example in which a shaft section is formed by a rotating shaft on which the rotor is mounted, a cylinder surrounding the rotating shaft is made a fixed cylinder, and a guide surface is provided on the inner circumference of the fixed cylinder.

Table 1 shows the results of starting properties when various starting experiments were conducted by combining the surface coarseness A of the above-mentioned guide face 112 for lower thrust bearing 103, guide face 113 of upper thrust bearing 109 and cylindrical guide face 106 of radial bearing 105 and surface coarseness B of counter faces 110, 111 and 108 for rotor 107 as shown in Table 1.

Actuating properties 1

Under normal circumstances, the starting tests for the optical deflecting apparatus wherein a dynamic pressure bearing shaft was built-in were conducted.

Actuating properties 2

After leaving one hour at 5° C., the apparatus was returned to normal temperature so that dew condensation on the bearing surfaces. After natural drying for 4 hours, starting tests were conducted.

A limiter of 1.5 A was applied to the actuating current so that actuating performance was evaluated.

TABLE 1

| Surface coarseness A | Surface coarseness B | Starting property 1 | Starting property 2 |
|---|---|---|---|
| Ra 0.2 | Ra 0.2 | A | D |
| 0.2 | 0.3 | A | B |
| 0.2 | 0.5 | A | A |
| 0.2 | 0.8 | A | A |
| 0.2 | 1.0 | A | A |
| 0.2 | 2.0 | A | A |
| 0.2 | 3.0 | B | B |
| 0.2 | 3.5 | C | C |

In the above-mentioned Table 1, mark "A" indicates that the rotation arrives at the steady-state rotation number (20,000 rpm) within 5 seconds, mark "B" indicates that the rotation arrives at the steady-state rotation number (20,000 rpm) within 7 seconds, mark "C" indicates that the rotation arrives at the steady-state after 1 0 seconds or more, and mark "D" indicates that the apparatus did not rotate or did not arrives at the steady-state rotation number (20,000 rpm).

As described above, it was understood that, in the combination of surface coarseness A of smooth surfaces of guide face 112 for the above-mentioned thrust bearing 103, guide face 113 for upper thrust bearing 109 and guide face 106 for radial bearing 105 and surface coarseness B of coarse surfaces of counter faces 11A, 11B and 11C for rotor 107, surface coarseness A of smooth face is Ra 0.3 or less (preferably, Ra 0.2 or less) and surface coarseness B of coarse surface is Ra 0.3-3 (preferably, Ra is 0.4-2.5, and more preferably 0.5 or more and 2.0 or less). In addition, it was also understood that the difference of each Ra between facing surfaces is preferably 0.1-2.8 (specifically preferably, 0.2-2.0). Further, in the case that surface coarseness Ra is larger than 3.0, the generated dynamic pressure becomes insufficient and the starting property is deteriorated. Also, in the case that surface coarseness Ra is larger than 0.3, friction between surfaces becomes so large that the starting performance will be lowered.

In addition, the same results were obtained when experiment were conducted under conditions described in the second example, when the surface coarseness 1 and 2 in Table 1 were switched, when only guide face 10C for lower thrust bearing 103 was relatively coarse and counter face 112 for rotor 107 was relatively smooth and when guide face 10C for lower thrust bearing 103 and guide face 10B for radial bearing 105 were coarser and counter faces therefor were smoother.

Due to the above-mentioned examples, defective starting of the dynamic pressure bearing is prevented and thereby starting electrical current could be reduced. In addition, processing cost of the dynamic pressure bearing could be reduced.

What is claimed is:

1. An apparatus for supporting a rotator having a rotation axis, comprising:

a radial bearing having a radial bearing surface for supporting the rotation axis of the rotator;

a thrust bearing provided at least one side of the radial bearing and having a thrust bearing surface for regulating a movement of the rotator in an axial direction;

the rotator having a supported surface facing the radial bearing surface and a regulated surface facing the thrust bearing surface;

wherein at least one of the radial bearing surface, the supported surface, the thrust bearing surface and the regulated surface is a rough surface having a center-line mean roughness not less than 0.3 and a surface facing the rough surface is a smooth surface having a center-line mean roughens less than 0.3.

2. The apparatus of claim 1, wherein the center-line mean roughness of the rough surface is 0.3 to 3.0.

3. The apparatus of claim 1, wherein the center-line mean roughness of the smooth surface is less than 0.2.

4. The apparatus of claim 1, wherein a difference in center-line mean roughness between the rough surface and the smooth surface is 0.1 to 2.8.

5. The apparatus of claim 1, wherein the radial bearing is stood vertically and the thrust bearing is provided beneath the radial bearing.

6. The apparatus of claim 5, wherein the thrust bearing surface has the rough surface and the regulated surface of the rotator has the smooth surface.

7. The apparatus of claim 5, wherein the thrust bearing surface has the smooth surface and the regulated surface of the rotator has the rough surface.

8. The apparatus of claim 5, wherein the thrust bearing surface and the radial bearing surface have the rough surface and the regulated surface and the supported surface of the rotator have the smooth surface.

9. The apparatus of claim 5, wherein the thrust bearing surface and the radial bearing surface have the smooth surface and the regulated surface and the supported surface of the rotator have the rough surface.

10. The apparatus of claim 5, further comprising an upper thrust bearing provided on the radial bearing.

11. The apparatus of claim 5, further comprising a stopper provided on the radial bearing, wherein the stopper regulates the rotator from moving upward.

12. The apparatus of claim 5, wherein one of the thrust bearing surface and the regulated surface is provided with a groove for generating a dynamic pressure by which the rotator is floated on the thrust bearing surface.

13. The apparatus of claim 1, wherein the rotator is provided with a polygonal mirror on its outer circumference and with a magnet on its one side and the apparatus comprises a stator coil at a position opposite to the magnet so that the polygonal mirror is rotated together with the rotator.

14. The apparatus of claim 13, further comprising a laser beam generator and a photoreceptor, wherein the polygonal mirror deflects a laser beam so as to scan the photoreceptor so that the photoreceptor is exposed with the scanning laser beam.

15. An apparatus for deflecting a laser beam, comprising:

a rotor having a rotation axis, a circumference, a first and second ends;

a polygonal mirror provided around the circumference of the rotor, for deflecting the laser beam;

a magnet provided on at least one of the first and second ends;

a stator coil provided so as to face the magnet;

a radial bearing having a radial bearing surface for supporting the rotation axis of the rotator;

a thrust bearing provided at least one side of the radial bearing and having a thrust bearing surface for regulating a movement of the rotator in an axial direction; and the rotator having a supported surface facing the radial bearing surface and a regulated surface facing the thrust bearing surface;

wherein at least one of the radial bearing surface, the supported surface, the thrust bearing surface and the regulated surface is a rough surface having a center-line mean roughness not less than 0.3 and a surface facing the rough surface is a smooth surface having a center-line mean roughens less than 0.3.

16. An apparatus for forming an image, comprising:

a photoreceptor;

a laser beam generator; and a laser beam deflector for deflecting the laser beam so that the photoreceptor is scanned with the laser beam and the image is formed on the photoreceptor;

the laser beam deflector including a rotor having a rotation axis, a circumference, a first and second ends;

a polygonal mirror provided around the circumference of the rotor, for deflecting the laser beam;

a magnet provided on at least one of the first and second ends;

a stator coil provided so as to face the magnet; a radial bearing having a radial bearing surface for supporting the rotation axis of the rotator;

a thrust bearing provided at least one side of the radial bearing and having a thrust bearing surface for regulating a movement of the rotator in an axial direction; and the rotator having a supported surface facing the radial bearing surface and a regulated surface facing the thrust bearing surface;

wherein at least one of the radial bearing surface, the supported surface, the thrust bearing surface and the regulated surface is a rough surface having a center-line mean roughness not less than 0.3 and a surface facing the rough surface is a smooth surface having a center-line mean roughens less than 0.3.

* * * * *